March 9, 1937. T. D. PARKIN 2,073,117
THERMIONIC OSCILLATION GENERATOR
Filed June 7, 1934 2 Sheets-Sheet 1

INVENTOR
THOMAS DIXON PARKIN
BY
ATTORNEY

March 9, 1937.  T. D. PARKIN  2,073,117
THERMIONIC OSCILLATION GENERATOR
Filed June 7, 1934   2 Sheets-Sheet 2

INVENTOR
THOMAS DIXON PARKIN
BY
ATTORNEY

Patented Mar. 9, 1937

2,073,117

UNITED STATES PATENT OFFICE 2,073,117

THERMIONIC OSCILLATION GENERATOR

Thomas Dixon Parkin, Broomfield, near Chelmsford, England, assignor to Radio Corporation of America, a corporation of Delaware Application June 7, 1934, Serial No. 729,377
In Great Britain June 8, 1933

2 Claims. (Cl. 250—36)

This invention relates to thermionic oscillation generators and more specifically to valve generators suitable for use for wireless telegraphy and telephony and other like high frequency purposes and wherein the oscillations are generated by means including a thermionic valve and an electromechanical resonant device, such as a piezo-electric crystal which feeds back energy from the output to the input electrodes of the valve.

Figure 1:
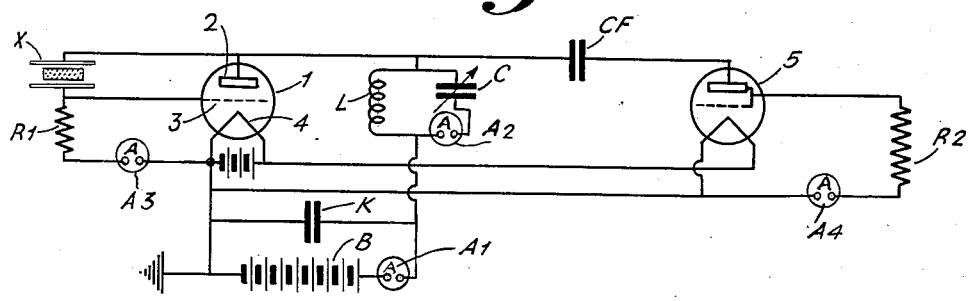
Figure 2:
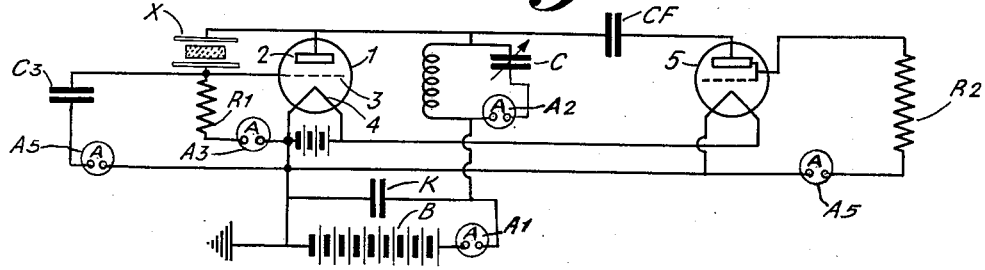
Figure 4:
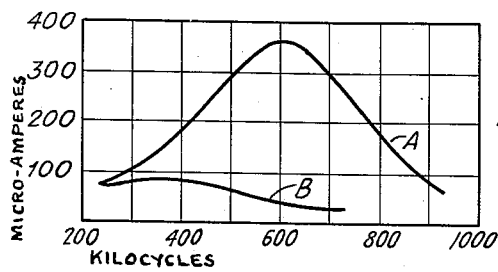
Figure 3:
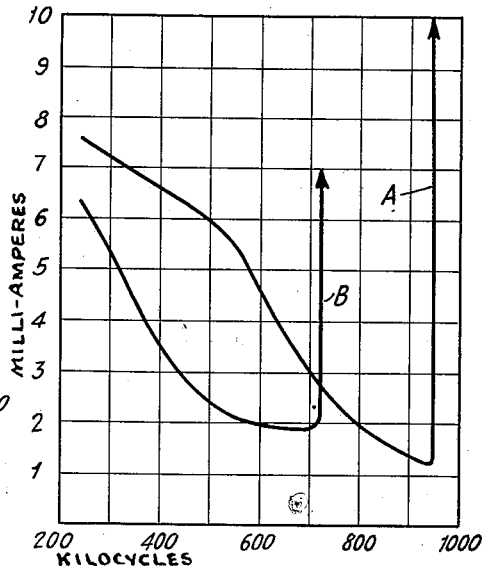
Figure 7:
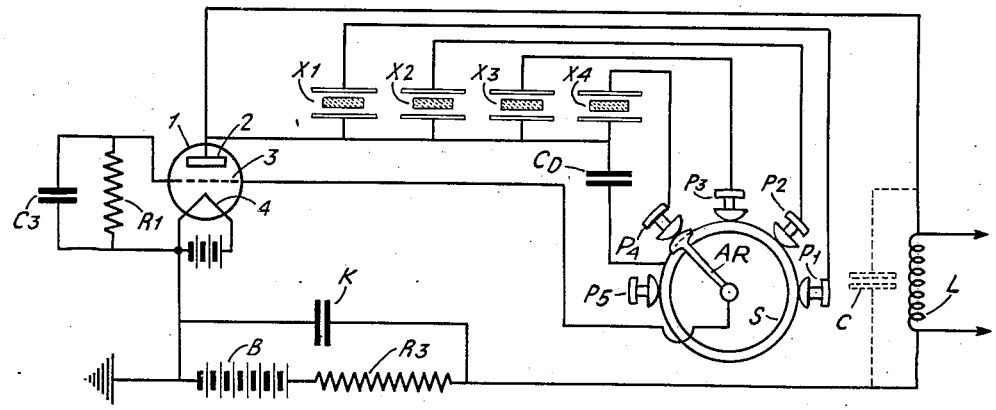
Figure 5:
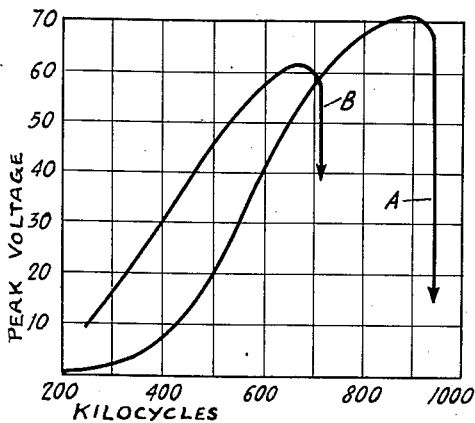
Figure 6:
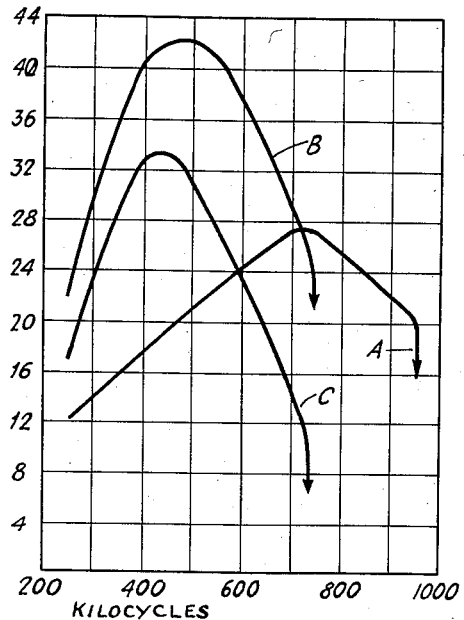

In the drawings, Figure 1 shows a circuit diagram of a conventional piezo-electrically controlled oscillation generator;

Figure 2 is a circuit diagram of an oscillation generator which embodies certain features of my invention;

Figures 3, 4, 5, and 6 show characteristic performance curves of different embodiments of an oscillator generator, in one of which embodiments the features of my invention are incorporated; and Figure 7 shows diagrammatically a preferred embodiment of my invention in which there is provided a plurality of piezo-electric vibrators, any one of which may be selected for controlling the frequency of oscillations of an oscillation generator, which also embodies certain other features of my invention.

A common form of piezo-electric thermionic oscillation generator consists as is shown in the accompanying Figure 1 of a triode 1 having its plate 2 connected to its cathode 4 through a resonant circuit LC (that is a parallel tuned circuit which is resonant at a frequency somewhat lower than that of a crystal) in series with an anode battery B (which may be shunted by a by-pass condenser K) the plate 2 being connected to the grid 3 through the piezo-electric crystal X and the grid being connected to the cathode 4 through a leak resistance $R_1$. In Figure 1, $A_1$, $A_3$, are direct current measuring devices and $A_2$ a high frequency current measuring device and the output high frequency oscillations which are taken off from the tuned circuit LC are shown as applied to a well known form of thermionic "peak voltmeter" comprising a valve 5 connected as a diode having a high resistance $R_2$ in series with a direct current measuring instrument $A_4$ connected between anode and cathode, $C_F$ being the input coupling condenser to the voltmeter diode 5. The amplitude of the high frequency oscillations obtained from the valve 1 will depend upon a number of different factors including the difference between the natural frequency of the piezo-electric crystal X, and the natural frequency of the tuned circuit LC and assuming these frequencies are different, the further apart they are the lower will be the amplitude of the high frequency oscillations.

In fact, if the circuit LC be varied in frequency the results obtained will be as typified by the curves marked A in the accompanying Figures 3, 4, 5 and 6, in all of which figures the abscissae are values of natural frequency of LC in kilocycles. These curves were obtained with a crystal of about 953 kc. frequency. In curve A of Figure 3 the ordinates are readings of $A_1$ in milliamperes; in curve A of Figure 4 the ordinates are readings of $A_3$ in micro-amperes; in curve A of Figure 5 the ordinates are products of the readings of $A_4$ in milli-amperes into the value of the resistance $R_2$ (these products give the peak voltages at the terminals of the diode); and in curve A of Figure 6 the ordinates are readings of $A_2$ in milli-amperes.

It is usual practice in piezo-electric thermionic oscillation generators of the kind in question to operate the circuit with the two resonant frequencies (that of the crystal and that of the tuned circuit LC) some way apart in order to secure stability (for example with a crystal of 935 kc. the tuned circuit frequency would be generally chosen somewhere between 450 kc. and 600 kc. or thereabouts) but this leads to practical difficulties in oscillation generators intended to be used to produce any one of a plurality of different frequencies each frequency being stabilized by a different crystal. From the foregoing, it will be appreciated that in the case just referred to where any of a plurality of piezo-electric crystals may be required to be connected in circuit, the high frequency output will depend upon the crystal actually chosen and that whose frequency is nearest to the natural frequency of the tuned circuit will give maximum high frequency voltage output.

The object of the present invention is to provide arrangements avoiding this type of difficulty.

In one way of carrying out this invention, a thermionic oscillation generator in which an electromechanical resonant device is connected in an energy feed back circuit between the output and input electrodes of a thermionic valve having a tuned circuit associated therewith, is characterized by the provision of means for lowering the effective impedance of the input circuit of the valve. The means for lowering the effective impedance of the said input circuit preferably take the form of a simple single condenser connected in shunt with the normally provided grid leak ($R_1$ of Figure 1) between the grid and cathode of the valve.

One way of carrying out this invention is illustrated in the accompanying Figure 2 which, as will be seen, is the same as the circuit of Figure 1 except for the shunt circuit consisting of the condenser $C_3$ in series with the current measuring instrument $A_5$. If desired, a switch may be connected in series with the members $C_3$ and $A_5$ and also, if desired, a resistance may be placed in series with LC to act as a protective resistance or to reduce the voltage applied to the anode. As in Figure 1, the second valve 5 is, of course, not part of the oscillation generating system, but only forms part of an arrangement for measuring the high frequency voltage set up across the tuned circuit LC.

The results obtained from Figure 2 are shown by the curves B of Figures 3, 4, 5 and 6 which curves correspond to the curves A of these figures and it will at once be apparent that over a useful band of frequencies of tuning of the anode circuit LC about 450 kc. to 600 kc. in Figures 3 to 6, the output voltages are higher. Thus, by using the grid shunting condenser a common anode circuit may be used with any of a number of different crystals, and a reasonably high output obtained with each crystal. It will be noted that the point of output voltage collapse occurs earlier with an arrangement as shown in Figure 2 than with an arrangement as shown in Figure 1 (compare curve B with curve A of Figure 5) and further, upon reference to Figure 6 it will be seen that the current through the condenser C of Figure 2 is larger than in the condenser C of Figure 1 for given conditions. (In Figure 6 curve C is the curve of current through the condenser $C_3$ of Figure 2.) In general, it is found that the smaller the value of $C_3$, the nearer will the point of output voltage collapse be to the crystal frequency. It will be observed from Figure 5 that the "crown" of curve A is above that of curve B, but this is of no importance in practice since the "crowns" occur outside the useful bands of frequencies of tuning of LC.

To give an example of practical results in terms of figures, with one arrangement as shown in Figure 2 and employing valves each having an internal impedance of 3500 ohms, an amplification factor of 8 and a mutual conductance of 2.28 milli-amperes per volt (at zero grid volts and 100 volts on the anode) the following results were obtained with two different crystals of frequencies 654 and 953 kilocycles respectively, the frequency of the resonant circuit being 540 kilocycles in each case:—With the lower frequency crystal the D. C. anode feed taken by the first valve was 5.4 milli-amperes, the high frequency current in the tuned circuit was 16 milli-amperes, the grid current of the first valve was 0.16 milli-ampere, and the peak output voltage (the current in the anode circuit of the second triode multiplied by the resistance inserted in that anode circuit) was 28 volts, all these results being obtained with a switch in series with $C_3$ open, i. e. with the circuit operating as a circuit as shown in Figure 1. When, however, the switch was closed so that the circuit operated as a circuit as shown in Figure 2, the D. C. anode feed for the first valve dropped to 4.2 milli-amperes, the high frequency current in the tuned circuit rose to 19 milli-amperes, the grid current fell to 0.04 milli-ampere, and the peak output voltage rose to 40 volts, the current through the condenser in series with the switch in the grid circuit of the first valve being 8.5 milli-amperes. Generally, similar results were obtained with the high frequency crystal (of 953 kilocycles):—With the switch open the anode feed was 5.9 milli-amperes, but only 3.8 with the switch closed; the high frequency current was 16 milli-amperes with the switch open, but 35 milli-amperes with the switch closed; the grid current of the first valve was 0.24 milli-ampere with the switch open, but 0.1 milli-ampere with the switch closed; and the peak output voltage was 14.5 with the switch open and 55 volts with the switch closed, the current through the condenser in the grid circuit of the first valve being 30 milli-amperes when the switch was closed. It will thus be seen that the addition of the condenser in the grid circuit of the first valve lowers the anode and grid currents, but increases the high frequency current in the resonant circuit and in consequence the high frequency voltage set up thereacross.

It will further be seen that most advantage was obtained with the higher frequency crystal and that when this crystal was used as in the ordinary way the output obtained was much inferior to that obtained with the lower frequency crystal. It appears that the theoretical explanation of the advantage of the invention is that the condenser in the grid circuit lowers the impedance thereof so that less high frequency is applied to the grid, and the rectified grid current is therefore of reduced value. Of course, the anode current falls, but owing to the admittance of the condenser in the grid circuit permitting greater high frequency current to pass from the crystal in the complete circuit the high frequency current in the tuned circuit becomes increased and the voltage set up thereacross accordingly also increases. It will be seen that for a given high frequency voltage the current through the condenser in the grid circuit of the first valve varies directly with the frequency applied to it and, consequently, the feed back is greatest in the case of the highest frequency crystal in a multi-crystal system employing a common valve and anode circuit.

The accompanying Figure 7 shows a multi-crystal generator circuit in accordance with this invention and wherein any of a plurality of crystals may be rendered operative. In Figure 7 the crystals are marked $X_1$, $X_2$, $X_3$, and $X_4$ and are all connected together at one side to the anode 2. Each crystal is connected at its other side to one of four spring contacts $P_1$, $P_2$, $P_3$, or $P_4$ which normally bear against a metal ring S which is connected through a condenser $C_D$ to the anode 2. AR is a rotary connector arm which is connected to the grid 3 and which may be moved to contact with any of the spring contacts $P_1$ to $P_4$ (or $P_5$), the arrangement being such that the arm, when contacting with any spring contact, lifts that contact from the ring S. The arm AR is so shaped that a portion thereof extends beyond the periphery of the ring S and reaches over the face thereof without touching the ring S in order that it may lift the contacts $P_1$—$P_4$ out of contact with the ring. Insulating material may, of course, be provided between the arm AR and the ring S if desired. The condenser $C_D$ is sufficiently large to act as a short circuit for currents at the frequency of any of the crystals. With the arm AR in the position shown, crystal $X_4$ is in use and the other crystals are shorted by one another and by the condenser $C_D$. Spring contact $P_5$ is unconnected and merely serves to give an "off" position to the arm AR. $R_3$ is an optional anode resistance and the condenser C is shown dotted to indicate that in some cases (where the self-capacity of L is sufficiently high and the tuning of LC is not required to be varied) it may be dispensed with, as, of course, it may be, in like circumstances in a generator as incorporated in the arrangement of Figure 2.

It will be seen that with the arrangement shown in Figure 7 the contact arm can be moved to select any one crystal and that the other crystals will be rendered incapable of operation in such manner that inter-action between operating and non-operating crystals is substantially prevented.

Having now particularly described and ascertained the nature of my said invention and in what manner the same is to be performed, I declare that what I claim is:

1. In an oscillation generator system, an electron discharge device, a plurality of piezo-electric elements each having one of its electrodes connected to the anode of said electron discharge device, a capacitor of negligible impedance value at any of the operating frequencies of said system, and switching means for selectively introducing one of said piezo-electric elements into closed circuit relation between the anode and the control grid of said electron discharge device and for simultaneously short-circuiting the electrodes of the remaining piezo-electric elements through said capacitor.

2. In an oscillation generator, an electron discharge tube having a cathode, an anode, and a grid, an input circuit connected between the cathode and grid, an output circuit connected between the cathode and anode, a source of energy applied to said output circuit, a plurality of piezo-electric frequency controlling elements, means for selectively and individually introducing any one of said elements into cooperative connection between the grid and the anode, a capacitor of negligible impedance value at the operating frequencies of said generator, and means including a switch having connections on one side to one electrode of each of the non-selected frequency controlling elements and on the other side through said capacitor to the other electrodes of the non-selected elements for rendering said non-selected elements inactive.

THOMAS DIXON PARKIN.